United States Patent [19]

Bott

[11] Patent Number: 4,534,496
[45] Date of Patent: Aug. 13, 1985

[54] LUGGAGE CARRIER WITH ILLUMINATING MEANS

[76] Inventor: John A. Bott, 931 Lake Shore Dr., Grosse Pointe Shores, Mich. 48236

[21] Appl. No.: 571,864

[22] Filed: Jan. 18, 1984

Related U.S. Application Data

[60] Continuation-in-part of Ser. No. 554,683, Nov. 23, 1983, , which is a continuation of Ser. No. 485,859, Apr. 18, 1983, Pat. No. 4,440,333, which is a continuation of Ser. No. 242,138, Mar. 9, 1981, , which is a continuation of Ser. No. 56,373, Jul. 10, 1979, , which is a division of Ser. No. 924,072, Jul. 7, 1978, Pat. No. 4,182,471, which is a division of Ser. No. 743,602, Nov. 22, 1976, Pat. No. 4,099,658, which is a continuation of Ser. No. 486,415, Jul. 8, 1974, abandoned.

[51] Int. Cl.³ .............................................. B60R 9/00
[52] U.S. Cl. .................................. 224/326; 296/37.7; 224/321; 362/73
[58] Field of Search ............... 224/309, 321, 324, 325, 224/326, 329, 330; 296/37.7, 76; 280/769; 340/87; 362/73, 82, 80

[56] References Cited

U.S. PATENT DOCUMENTS

| 1,209,427 | 12/1916 | Goldsworthy | 340/87 |
|---|---|---|---|
| 1,507,702 | 9/1924 | Harris | 362/82 |
| 2,217,688 | 10/1940 | Larson et al. . | |
| 2,336,905 | 12/1943 | Welsh | 340/87 |
| 2,486,476 | 11/1949 | Kelley | 340/87 |
| 2,584,292 | 2/1952 | Rogers | 340/87 |
| 2,676,311 | 4/1954 | Palazzolo | 340/87 X |
| 2,783,367 | 2/1957 | Locke | 340/87 X |
| 2,843,729 | 7/1958 | Materese . | |
| 2,907,295 | 10/1959 | Delaney | 362/80 X |
| 3,278,741 | 10/1966 | Wood | 362/80 |
| 3,375,365 | 3/1968 | Gross . | |
| 3,460,728 | 8/1969 | Adamson . | |
| 3,519,180 | 7/1970 | Bott . | |
| 3,590,236 | 6/1971 | Ussery | 362/82 |
| 3,691,366 | 9/1972 | Spreuer | 340/87 X |
| 3,779,436 | 12/1973 | Burland . | |
| 4,099,658 | 7/1978 | Bott | 224/326 |
| 4,114,789 | 9/1978 | Blaylock et al. . | |
| 4,170,323 | 10/1979 | Helm . | |
| 4,269,339 | 5/1981 | Bott . | |
| 4,449,167 | 5/1984 | Cohen | 362/80 X |

Primary Examiner—Stephen Marcus
Assistant Examiner—Robert Petrik
Attorney, Agent, or Firm—Harness, Dickey & Pierce

[57] ABSTRACT

An automobile luggage carrier of spaced side members and spaced cross members in which the carrier is supported at the front and rear corners on stanchions and in which the stanchions form part of the carrier and are firmly secured to the roof of an automobile and including an illuminating mechanism provided in certain or all of the stanchions to illuminate the area of the carrier and facilitate its use in the dark. Such illumination, either direct or reflective, would be highly visible to oncoming traffic and would contribute to the safe loading or unloading of the carrier in the dark. In an alternative embodiment, a deck mounted luggage carrier comprising a plurality of slat elements and at least one cross member supported by stanchions is integrated with an illuminating mechanism, such as the vehicle brake light, and/or tail light, and/or back-up light, which is operatively integrated with at least one of the stanchions and/or slat elements and/or cross member of the luggage carrier.

25 Claims, 6 Drawing Figures

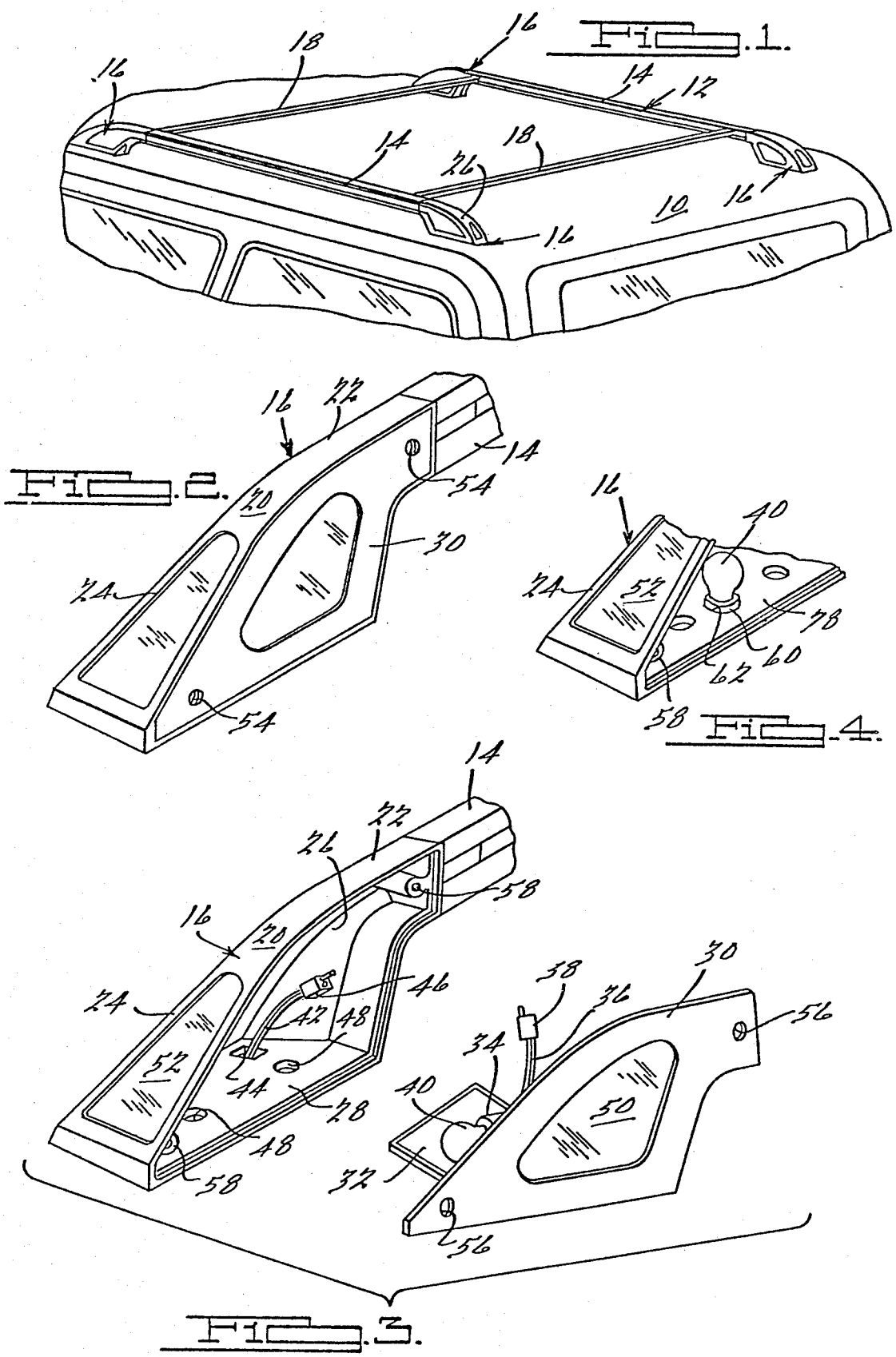

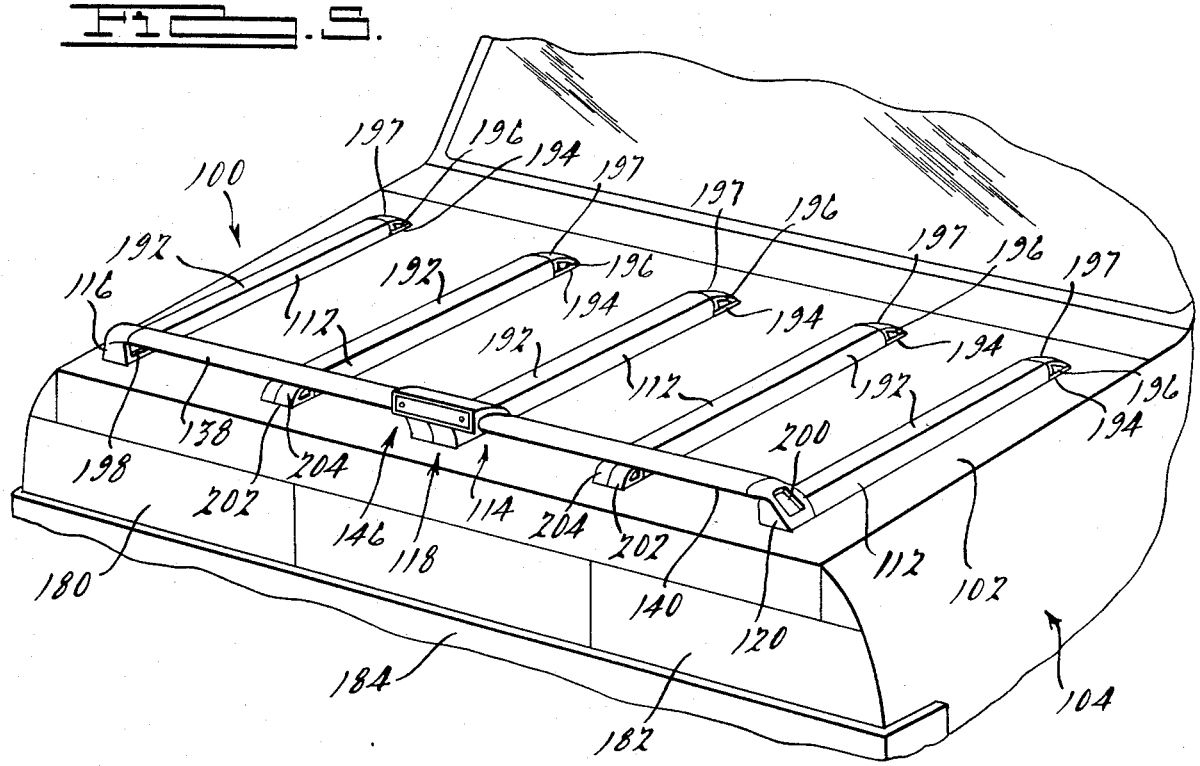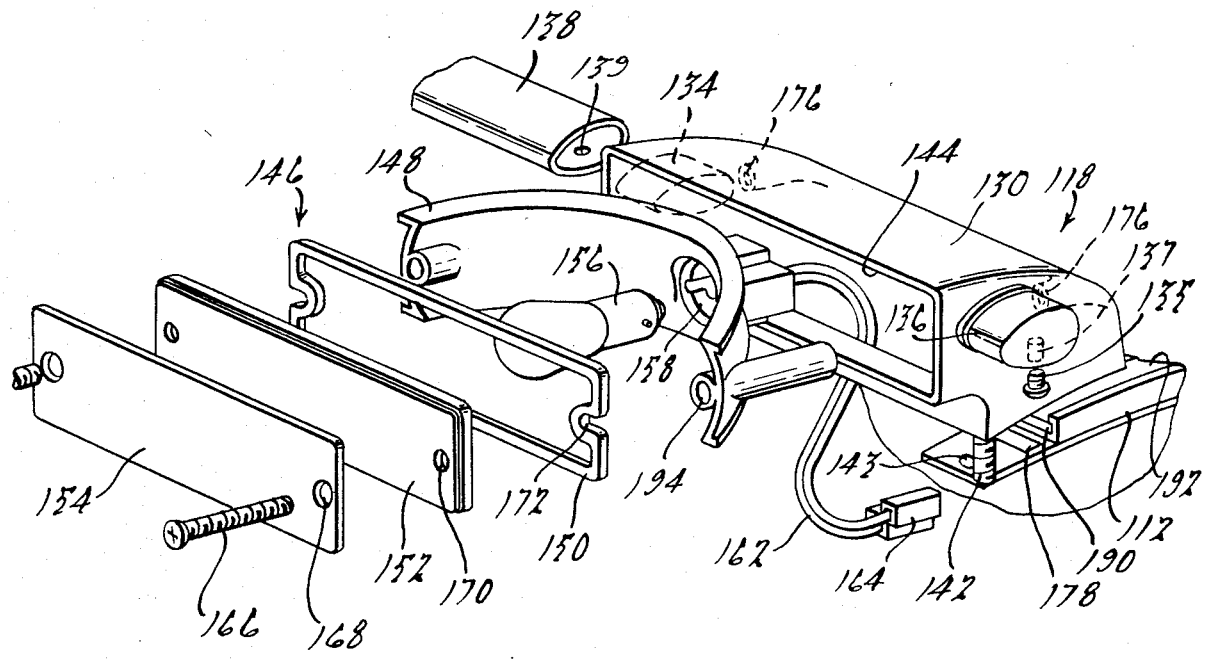

LUGGAGE CARRIER WITH ILLUMINATING MEANS

CROSS-REFERENCE TO RELATED APPLICATION

This is a continuation-in-part of Ser. No. 554,683, filed Nov. 23, 1983, which is a continuation of Ser. No. 485,859, filed Apr. 18, 1983, now U.S. Pat. No. 4,440,333, which is a continuation of Ser. No. 242,138, filed Mar. 9, 1981, which is a continuation of Ser. No. 56,373, filed July 10, 1979, which is a division of Ser. No. 924,072, filed July 7, 1978, now U.S. Pat. No. 4,182,471, which is a division of Ser. No. 743,602, filed Nov. 22, 1976, now U.S. Pat. No. 4,099,658, which is a continuation of Ser. No. 486,415, filed July 8, 1974, now abandoned.

BACKGROUND AND SUMMARY OF THE INVENTION

Luggage carriers or racks have long been used on outer surfaces of automotive vehicles for carrying many different types of articles which are secured to the carrier in one way or another. However, none are known which include illuminating means, either reflective or direct, as a part of the carrier itself. A search of the prior patents failed to reveal any. Lights on the tops of vehicles are known, such as those on emergency vehicles.

According to the present invention, illuminating means, either direct or reflective, or both, are disposed in the stanchions of the carrier which secure the carrier or a portion of the carrier to the roof. In the preferred form of the invention, electric light bulbs are disposed inside the stanchions, connected to the electrical system of the vehicle and operated by a conventional switch or pedal conveniently located within the vehicle. Transparent windows may be disposed in the inner faces of the stanchions facing inwardly of the carrier so that the entire area of the carrier may be illuminated in the dark. Further, reflective light sources are disposed in the end edges of the stanchions. Thus the entire area of the carrier may be illuminated in the dark not only facilitating the loading and unloading of the carrier but also serving as a signal to oncoming traffic and protecting the user against accidents.

The luggage carrier per se by way of illustration may be like that shown in John A. Bott U.S. Pat. No. 3,519,180, granted July 7, 1976. However, the invention may be used with other known forms of luggage carriers as will be apparent to those skilled in the art.

Luggage carriers have also been positioned on the rear deck of vehicles, such as U.S. Pat. No. 4,099,658, issued to applicant on July 11, 1978, and U.S. Pat. No. 4,182,471, issued to applicant on Jan. 8, 1980, or similar constructions. These carriers comprise a series of elongated slat support elements which help reinforce the deck and support loads on that article carrier along with article securing means comprising tie-down elements, stanchion elements, and one or more cross members extending between the stanchion elements.

In an alternative embodiment of the present invention, a carrier disposed on the rear deck of an automobile is integrated with a brake light, taillight, back-up light, or the like to comprise one mechanism to utilize both functions of brake indication and vehicle article carrying.

Other objects and advantages of the present invention will become apparent in the following detailed description taken in conjunction with the accompanying drawings.

BRIEF DESCRIPTION OF THE DRAWINGS

FIG. 1 is a perspective view of the upper portion of a vehicle body having a luggage carrier mounted thereon which incorporates the illuminating stanchions of the present invention;

FIG. 2 is a perspective view toward the inside surface and the end edge of one of the stanchions of the present invention;

FIG. 3 is a separated, perspective view of the stanchion shown in FIG. 2 with the inner face of the stanchion removed and showing the electrical connection for the light bulb mounted therein;

FIG. 4 is a partial view similar to FIG. 3 of a modified form of electric light bulb mounting;

FIG. 5 comprises an elevated perspective view of a deck mounted luggage carrier having a brake light integrated therein; and FIG. 6 is an exploded perspective view of the brake light and stanchion of the luggage carrier of FIG. 5.

DETAILED DESCRIPTION OF THE PREFERRED EMBODIMENTS

Referring to the drawings and particularly to FIG. 1, an automotive vehicle 10 is shown having a luggage carrier 12 mounted on the horizontal roof portion thereof. The luggage carrier 12 is shown by way of illustration as that disclosed in John A. Bott U.S. Pat. No. 3,519,180. The carrier 12 embodies side rails or members 14 arranged parallel and extending longitudinally of the body 10. The opposite ends of the side rails 14 are supported on stanchions 16. A pair of cross members 18 extend transversely between the side rails 14 adjacent the forward and rearward ends of the carrier 12.

The stanchions 16 are specially constructed for combination with the carrier 12 to provide illumination for the entire carrier area. The preferred embodiment is illustrated in FIGS. 2 and 3 and a modified embodiment is illustrated in FIG. 4.

Referring to FIGS. 2 and 3, each stanchion 16 comprises a hollow casing 20 having a top 22, a rear sloping surface 24, a closed outer wall 26, a bottom 28 and a removable inner wall 30.

The inside face of the wall 30 has a projecting shelf 32 fixed adjacent the lower edge thereof. The shelf serves to support a bulb socket 34 mounted on a bracket thereon with electric wires 36 projecting therefrom having a plug connector 38 at the ends thereof. An electric light bulb 40 is removably disposed in the socket 34.

Electric wires 42, suitably connected to the electric system of the vehicle extending through an opening in the roof and an opening 44 in a corner of the base 28. The wires 42 have a plug connector 46 connected to the ends of the wires 42 which is adapted to plug into the cooperating and interfitting connector 38 to complete the electric circuit to the bulb 40 when the wall 30 is mounted on the casing 20.

The stanchions 16 are secured to the vehicle top by screws (not shown) which pass through openings 48 in the base 28 and are screwed into underlying holes in the vehicle top.

The side 30 is formed with a transparent window 50 of glass or plastic.

The rear sloping wall 24 has a reflector 52 mounted thereon such reflector being of a selected, colored reflecting material and construction so that the vehicle is readily visable to oncoming traffic.

The side 30 is removably secured to the casing 20 by screws 54 which pass through openings 56 in the casing and into cooperating screw sockets 58 in the casing.

Referring to FIG. 4, a modified way of mounting the light bulb 40 is illustrated. In this embodiment a bulb socket assembly 60 is mounted on the roof of the vehicle and projects above the roof. The assembly 60 is electrically connected to the electric system of the vehicle through suitable lead wires. The assemblies 60 are positioned so that when the stanchions 16 and the carrier 12 are mounted on the vehicle roof, the assemblies 60 will project through aligned openings 62 in the base 28 of the stanchions.

The shelf 32 and the bulb mountings 34 of the prior embodiment, FIGS. 2 and 3, are dispensed with the inner cover or wall 30 is applied as above described.

In both embodiments and with the stanchions assembled and the bulbs 40 lit, light is projected over the entire carrier area as well as being projected beyond the car top so that plenty of illumination is provided to aid and protect the one loading or unloading the carrier. The reflectors 52 aid in protecting the user from being struck by oncoming traffic.

While the more illumination the better and therefore having all four stanchions illuminated is preferred, it is not necessary within the broad scope of the invention. For example, only the front pair, or the back pair, or one or the other of the side pairs may be illuminated within the scope of the invention as set forth in the claims.

In a further alternative embodiment, referring to FIGS. 5 and 6, a carrier 100 mounted to the rear deck or trunk lid 102 of an automobile 104 is illustrated comprising a plurality of elongated slats 112 and a cross member or restraining bar 114 mounted across the slats 112 at one end of the slats 112 by stanchions 116, 118 and 120. The stanchions 116 and 120 as illustrated are telescopically engageable with the restraining bar 114 and the slats 112 with the exterior surface of the stanchions 116 and 120 blending into generally the shape of the outer ends of the slats 112 and the cross-sectional shape of the restraining bar 114. The intermediate stanchion 118 (FIG. 6) includes a hollow casing 130 having two bosses 134 and 136 extending horizontally therefrom into engagement each with a portion 138 and 140, respectively, of the cross member 114. Each boss 134 or 136 is secured to the respective cross member portion 138 or 140 by a screw 135 threadably engageable with a threaded bore 137 in the boss 134 or 136 via an aperture 139 in the cross member portion 138 or 140. The stanchion is secured to the deck 102 at the middle slat by a bolt 142 engaged into a riv-nut 143 set in the deck 102. The stanchion 118 has a hollow interior and a recess 144 extending from the interior into which recess 144 a brake light 146 mechanism is disposed. The brake light mechanism 146 includes a light housing 148, gasket 150, red brake light cover element 152 and transparent cover element 154, along with a bulb 156 insertable into a socket 158 portion of the housing 148. Suitable wiring 162 and connector 164 are operably disposed to the light socket. Two screws 166 (one not shown) extend through suitable apertures 168, 170, 172, and 174 into threaded bores 176 in the housing 130 to hold all of the parts together in the final assembled disposition of the stanchion 118. A suitable aperture 178 is disposed in the deck 102 through which the wiring 162 and connector 164 can be disposed into operable association with the vehicle wiring for the brake light actuation or for whatever purpose the light is to be used.

Thus when the operator steps on his brake lights, in addition to observing the lower brake lights 180, 182 just above the bumper 184 of the vehicle 104, an additional brake light at a higher elevation will be observed by drivers behind the operated vehicle. The brake light 146 may just as readily be a taillight, back-up light, or otherwise if connected in operable association with a control for such a light.

The luggage carrier 100 illustrated in FIGS. 5 and 6 includes channels 190 within the slats 112 having inserts 192 disposed therein upon which articles may be set. The slats 112 extend longitudinally of the automobile 104 and have upper article supporting surfaces located between the surface of the deck 102 and the lower side of articles to be carried on the carrier 100. Each of the slats 112 have a substantially rectangular cross-section with major (width) and minor (height) transverse dimensions with the major dimensions being parallel to the deck surface and the article supporting surfaces to present a low profile on the deck surface. The forward edges of the slats 112 include end cap members 194 having integrated eyelet tie-down elements 196 which may also include a raised abutment 197 similar to that shown in applicant's above-referenced U.S. Pat. No. 4,099,658, although it is also contemplated that the end cap members 194 may have upper surfaces flush with the article supporting surfaces of the slats 112. The end cap members 194 may be secured within and with the slat 112 to the vehicle by a single fastener or may have some other alternative means for securing the slat 112 and end members 194 to the deck 102. The side stanchions 116 and 120 also have integrated tie-down elements 198 and 200. The rearward edge of selected slats may also have end caps 202 with or without integrated eyelet tie-down elements 204. The outside stanchions 116 or 120 may also include illuminating means operably associated with the brake pedal or otherwise.

Formal changes may be made in the specific embodiments of the invention illustrated without departing from the spirit of the invention the scope of which is set forth in the appended claims.

I claim:

1. An article carrier for an automobile including at least two parallel slats fixedly secured on a generally horizontally extending exterior automobile body surface, said slats extending generally longitudinally of the automobile and each having upper article supporting surface, said upper article supporting surfaces of said slats being located between said body surface and the lower side of articles on said carrier, each of said slats having major and minor transverse dimensions with said major dimensions being parallel to said body surface and said supporting surfaces;

a support pad disposed between each said slat and said body surface;

a pair of article securing members secured to one end of said slats and at least one restraining bar extending laterally between and secured adjacent its opposite ends to said members, and located above said automobile body surface and said slats;

at least one support stanchion disposed on said body surface between said article securing members to further support said at least one restraining bar, a single fastener securing and passing through said stanchion; and illuminating means disposed within said support stanchion and observable from the rearward end of the vehicle.

2. An article carrier for an automobile comprising a plurality of at least two parallel arranged slats disposed on a generally horizontally extending exterior body surface of the automobile and lying closely against said surface;

each of said slats having major and minor transverse dimensions, with said major dimension being arranged substantially parallel to said body surface, each of said slats having a generally horizontally arranged upper article supporting surface adapted to have articles supported directly thereupon, a pair of end members disposed one at each end of at least one of said slats, a support member comprising a front wall and a pair of sidewalls to form a housing having a rearwardly directed opening when said housing is disposed on said vehicle, said housing being in contact with one of said slats, means for securing said housing to said exterior body surface, elongated restraining means supported by two of said end members and said support member, and illuminating means disposed above said slats within said housing and facing rearwardly to be directed through said housing opening so as to be observable from a position behind the automobile.

3. An article carrier in accordance with claim 2 wherein at least one end member further comprises article securing means, wherein said article securing means comprises an eyelet disposed integrally in said end member.

4. The invention as set forth in claim 3 which includes at least one intermediate slat disposed between and extending parallel to said first-mentioned two parallel arranged slats, and which includes end cap means fixedly secured to at least one end of said intermediate slat and cooperable therewith for securing articles upon said article carrier.

5. The invention as set forth in claim 4 wherein the height of the upper surface of said end cap means is disposed approximately the same distance above said exterior body surface as said supporting surfaces of the associated pair of said slats.

6. The invention as set forth in claim 4 which further comprises a plurality of three intermediate slats disposed between and arranged generally parallel to said first-mentioned slats.

7. The invention as set forth in claim 3 wherein each said end member associated with each of said slats is disposed at the same longitudinal ends of said slats.

8. The invention as set forth in claim 6 wherein each said end member is secured to the forward longitudinal ends of each of said slats.

9. The invention as set forth in claim 7 further comprising at least one intermediate slat provided with an end member at both the forward and rearward ends thereof.

10. The invention as set forth in claim 4 wherein said exterior body surfaces of the automobile comprises the upper surface of the automobile trunk.

11. The invention as set forth in claim 2 wherein said pair of article securing members each comprise brackets for supporting said restraining bar, said brackets comprising first portions having an outer exterior surface that blends generally into the shape of the outer ends of said slats and second portions directed upwardly from said first portions toward the horizontal plane of said elevated restraining bar.

12. The invention as set forth in claim 11 wherein said second portions of said brackets comprise an outer peripheral portion which blends generally into the cross sectional shape of said restraining bar.

13. The invention as set forth in claim 11 wherein the cross sectional shape of said second portion of each of said brackets is of the same general cross sectional shape as the adjacent end of said restraining bar.

14. The invention as set forth in claim 11 wherein said second portion of each of said brackets is telescopically engageable with the adjacent end of said restraining bar.

15. The invention as set forth in claim 2 which includes at least one intermediate slat disposed between and extending parallel to said at least two parallel arranged slats, and which further includes additional end members fixedly secured to at least one end of each of said slats and cooperable therewith for securing articles upon said article carrier.

16. The invention as set forth in claim 15 wherein said end members associated with each of said slats are disposed at the same longitudinal ends of said slats.

17. The invention as set forth in claim 16 wherein said end members are secured to the forward longitudinal ends of each of said slats.

18. The invention as set forth in claim 17 wherein at least one of said intermediate slats is provided with end members at both the forward and rearward ends thereof.

19. The invention as set forth in claim 2 wherein said exterior body surfaces of the automobile comprises the upper surface of the automobile trunk.

20. The invention as set forth in claim 2 which further comprises a plurality of three intermediate slats disposed between and arranged generally parallel to said first-mentioned slats.

21. The invention as set forth in claim 2 wherein said elongated restraining means comprises an elevated restraining bar extending generally transversely of the automobile adjacent the rearward ends of said slats.

22. The invention as set forth in claim 15 wherein said illuminating means is mounted adjacent said restraining bar.

23. The invention as set forth in claim 2, wherein said illuminating means includes cover means for protection of the interior of said housing from environmental effects.

24. The invention as set forth in claim 23, wherein said cover means is comprised of a colored plastic material.

25. The invention as set forth in claim 15 wherein the height of the upper surface of said additional end members is disposed approximately the same distance above said exterior body surface as said supporting surfaces of the associated pair of said slats.

* * * * *